US009742531B2

(12) United States Patent
Raaf et al.

(10) Patent No.: US 9,742,531 B2
(45) Date of Patent: *Aug. 22, 2017

(54) DEMODULATION REFERENCE SIGNALS CONTAINING SIDE INFORMATION FOR INTERFERENCE CANCELLATION (71) Applicant: Intel IP Corporation, Santa Clara, CA (US)

(72) Inventors: Bernhard Raaf, Neuried (DE); Jan Ellenbeck, Munich (DE); Stefan Franz, Munich (DE); Sabine Roessel, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,602

(22) Filed: Oct. 24, 2016

(65) Prior Publication Data
US 2017/0041109 A1 Feb. 9, 2017

Related U.S. Application Data (63) Continuation of application No. 14/109,112, filed on Dec. 17, 2013, now Pat. No. 9,479,298.

(Continued)

(51) Int. Cl.
H04W 72/04 (2009.01)
H04L 5/00 (2006.01)
(Continued)

(52) U.S. Cl.
CPC .......... *H04L 5/0007* (2013.01); *H04B 15/00* (2013.01); *H04J 11/00* (2013.01); *H04L 5/0005* (2013.01);
(Continued)

(58) Field of Classification Search
CPC ..... H04L 5/001; H04L 5/0073; H04L 5/0062; H04L 5/0066; H04L 5/0091;
(Continued)

(56) References Cited

U.S. PATENT DOCUMENTS 6,275,543 B1 8/2001 Petrus et al.
8,031,105 B2 10/2011 Stayton
(Continued)

FOREIGN PATENT DOCUMENTS

CN 101411236 A 4/2009
CN 101836491 A 9/2010
(Continued)

OTHER PUBLICATIONS

"U.S. Appl. No. 14/109,112; Corrected Notice of Allowance mailed Jun. 28, 2016", 2 pgs.
(Continued)

Primary Examiner — Ricky Ngo
Assistant Examiner — Lan Huong Truong
(74) Attorney, Agent, or Firm — Schwegman Lundberg & Woessner, P.A.

(57) ABSTRACT

Embodiments for providing demodulation reference signals to provide side information for interference cancellation are generally described herein. In some embodiments, a subframe is prepared comprising two slots and configuring a physical resource block (PRB) for each slot, wherein each PRB comprises twelve Orthogonal Frequency Division Multiplexing (OFDM) subcarriers transmitting for a duration of 7 OFDM symbols per slot. In resource elements on each of three of twelve OFDM subcarriers, two pairs of demodulation reference signals (DMRS) are allocated to form three DMRS sets. Symbols are mapped with a first modulation for the two pairs of demodulation reference signals to three of the twelve OFDM subcarriers for trans- (Continued)

mission. A second modulation is added to a first of the three DMRS sets and a third modulation is added to a second of the three DMRS sets to indicate side information regarding an interfering signal for use in mitigating the interfering signal.

24 Claims, 7 Drawing Sheets

Related U.S. Application Data (60) Provisional application No. 61/843,826, filed on Jul. 8, 2013.

(51) Int. Cl.
| | |
|---|---|
| *H04W 48/16* | (2009.01) |
| *H04W 72/08* | (2009.01) |
| *H04W 28/04* | (2009.01) |
| *H04W 56/00* | (2009.01) |
| *H04W 84/18* | (2009.01) |
| *H04W 28/08* | (2009.01) |
| *H04W 40/24* | (2009.01) |
| *H04W 80/04* | (2009.01) |
| *H04W 88/02* | (2009.01) |
| *H04W 8/00* | (2009.01) |
| *H04B 15/00* | (2006.01) |
| *H04J 11/00* | (2006.01) |
| *H04W 72/12* | (2009.01) |
| *H04W 84/04* | (2009.01) |

(52) U.S. Cl.
CPC ............ *H04L 5/005* (2013.01); *H04L 5/0048* (2013.01); *H04L 5/0073* (2013.01); *H04W 8/005* (2013.01); *H04W 28/048* (2013.01); *H04W 28/08* (2013.01); *H04W 40/246* (2013.01); *H04W 48/16* (2013.01); *H04W 56/002* (2013.01); *H04W 72/044* (2013.01); *H04W 72/0413* (2013.01); *H04W 72/082* (2013.01); *H04W 72/1215* (2013.01); *H04W 80/04* (2013.01); *H04W 84/18* (2013.01); *H04W 88/02* (2013.01); *H04W 84/042* (2013.01); *Y02B 60/50* (2013.01)

(58) Field of Classification Search
CPC ... H04L 5/0035; H04L 5/0007; H04L 5/0032; H04L 5/0053; H04W 72/0453; H04W 72/042
See application file for complete search history.

(56) References Cited

U.S. PATENT DOCUMENTS

| | | |
|---|---|---|
| 9,264,191 B2 | 2/2016 | Ellenbeck et al. |
| 9,270,425 B2 | 2/2016 | Xue et al. |
| 9,479,298 B2 | 10/2016 | Raaf et al. |
| 9,564,955 B2 | 2/2017 | Lee et al. |
| 2008/0316935 A1 | 12/2008 | Bala et al. |
| 2009/0264142 A1 | 10/2009 | Sankar et al. |
| 2009/0305636 A1 | 12/2009 | Hagerman et al. |
| 2009/0323838 A1 | 12/2009 | Ho et al. |
| 2010/0054114 A1 | 3/2010 | Li et al. |
| 2010/0074347 A1 | 3/2010 | Lomnitz et al. |
| 2010/0087149 A1 | 4/2010 | Srinivasan et al. |
| 2010/0087221 A1 | 4/2010 | Srinivasan et al. |
| 2010/0303034 A1 | 12/2010 | Chen et al. |
| 2011/0274207 A1 | 11/2011 | Khojastepour et al. |
| 2011/0305213 A1 | 12/2011 | Lohr et al. |
| 2011/0312319 A1 | 12/2011 | Lindoff et al. |
| 2012/0076100 A1 | 3/2012 | Noh et al. |
| 2012/0115521 A1 | 5/2012 | Tong et al. |
| 2012/0120924 A1 | 5/2012 | Montojo et al. |
| 2012/0155414 A1 | 6/2012 | Noh et al. |
| 2012/0201134 A1 | 8/2012 | Wang Helmersson et al. |
| 2012/0257568 A1 | 10/2012 | Cai et al. |
| 2012/0275402 A1 | 11/2012 | Prasad et al. |
| 2013/0044697 A1 | 2/2013 | Yoo et al. |
| 2013/0089040 A1 | 4/2013 | Tabet et al. |
| 2013/0114451 A1 | 5/2013 | Al-dhahir et al. |
| 2013/0148754 A1 | 6/2013 | Tee et al. |
| 2013/0201848 A1 | 8/2013 | Kazmi et al. |
| 2013/0265955 A1 | 10/2013 | Kim et al. |
| 2013/0272250 A1 | 10/2013 | Shimezawa et al. |
| 2013/0294368 A1 | 11/2013 | Bendlin et al. |
| 2013/0343215 A1 | 12/2013 | Li et al. |
| 2014/0092882 A1 | 4/2014 | Sankar et al. |
| 2014/0153510 A1 | 6/2014 | Gomadam et al. |
| 2014/0233407 A1 | 8/2014 | Pourahmadi et al. |
| 2014/0293890 A1 | 10/2014 | Davydov et al. |
| 2014/0301303 A1 | 10/2014 | Roman et al. |
| 2014/0334402 A1 | 11/2014 | Chen et al. |
| 2014/0362769 A1 | 12/2014 | Chen et al. |
| 2015/0003343 A1 | 1/2015 | Li et al. |
| 2015/0009903 A1 | 1/2015 | Xue et al. |
| 2015/0009948 A1 | 1/2015 | Raaf et al. |
| 2015/0009964 A1 | 1/2015 | Ellenbeck et al. |
| 2015/0256280 A1 | 9/2015 | Park et al. |
| 2015/0365154 A1 | 12/2015 | Davydov et al. |
| 2016/0080963 A1 | 3/2016 | Marinier et al. |

FOREIGN PATENT DOCUMENTS

| | | |
|---|---|---|
| CN | 102017583 A | 4/2011 |
| CN | 102369673 A | 3/2012 |
| CN | 103002581 A | 3/2013 |
| CN | 103067966 A | 4/2013 |
| CN | 103188056 A | 7/2013 |
| CN | 105264797 A | 1/2016 |
| CN | 105359438 A | 2/2016 |
| CN | 105409146 A | 3/2016 |
| CN | 106059702 A | 10/2016 |
| EP | 2579661 A1 | 4/2013 |
| EP | 2592763 A2 | 5/2013 |
| KR | 1020110080116 A | 7/2011 |
| KR | 1020120123247 A | 11/2012 |
| WO | WO-2010050689 A2 | 5/2010 |
| WO | WO-2011020062 A2 | 2/2011 |
| WO | WO-2011058195 A1 | 7/2011 |
| WO | WO-2011083945 A2 | 7/2011 |
| WO | WO-2011085195 A1 | 7/2011 |
| WO | WO-2011124028 A1 | 10/2011 |
| WO | WO-2012075387 A1 | 6/2012 |
| WO | WO-2012090851 A1 | 7/2012 |
| WO | WO-2015006218 A1 | 1/2015 |
| WO | WO-2015006229 A1 | 1/2015 |
| WO | WO-2015006289 A1 | 1/2015 |

OTHER PUBLICATIONS

"U.S. Appl. No. 14/109,112, Non Final Office Action mailed Jan. 21, 2016", 16 pgs.
"U.S. Appl. No. 14/109,112, Notice of Allowance mailed Jun. 21, 2016", 9 pgs.
"U.S. Appl. No. 14/109,112, Response filed May 23, 2016 to Non Final Office Action mailed Jan. 21, 2016", 13 pgs.
"Interference Issues for Supporting Backward Conpatibility in TDD eIMTA Systems", HTC, 4 pgs.
"International Application Serial No. PCT/US2014/045579, International Search Report mailed Nov. 18, 2014", 3 pgs.
"International Application Serial No. PCT/US2014/045579, Written Opinion mailed Nov. 18, 2014", 4 pgs.
"International Application Serial No. PCT/US2014/045599, International Search Report mailed Nov. 18, 2014", 3 pgs.
"International Application Serial No. PCT/US2014/045599, Written Opinion mailed Nov. 18, 2014", 4 pgs.
"International Application Serial No. PCT/US2014/045690, International Search Report mailed Oct. 28, 2014", 3 pgs.

(56) References Cited

OTHER PUBLICATIONS

"International Application Serial No. PCT/US2014/045690, Written Opinion mailed Oct. 28, 2014"; 5 pgs.
"LTE in a Nutshell: The Physical Layer", Telesystem Innovations Inc. White Paper, [Online]. Retrieved from the Internet: <URL: http://vww.tsiwireless.com/docs/whitepapers/LTE%20in%20a120Nutshell*20-420Physical%20Layer.pdf, 18 pgs.
"Technical Specification Group Radio Access Network; Evolved Universal Terrestrial Radio Access (E-UTRA) and Evolved Universal Terrestrial Radio Access Network (E-UTRAN)", 3GPP TS 36.300 V10.2.0, (Dec. 2010), 200 pgs.
"Technical Specification Group Radio Access Network; Evolved Universal Terrestrial Radio Access (E-UTRA) and Evolved Universal Terrestrial Radio Access Network (E-UTRAN)", 3GPP TS 36.300 V12.0.0, (Dec. 2013), 208 pgs.
"Technical Specification Group Radio Access Network; Evolved Universal Terrestrial Radio Access (E-UTRA) and Evolved Universal Terrestrial Radio Access Network (E-UTRAN);", 3GPP TS 36.300 V8.4.0, (Mar. 2008), 126 pgs.
"Technical Specification Group Radio Access Network; Evolved Universal Terrestrial Radio Access (E-UTRA); Physical channels and modulation", 3GPP TS 36.211 V11.6.0, (Sep. 2014), 120 pgs.
"3rd Generation Partnership Project; Technical Specification Group Radio Access Network; Evolved Universal Terrestrial Radio Access (E-UTRA); Multiplexing and channel coding (Release 11)", 3GPP TS 36.212 V11.3,0, (Jun. 2013), 84 pgs.
"3rd Generation Partnership Project; Technical Specification Group Radio Access Network; Evolved Universal Terrestrial Radio Access (E-UTRA); Physical Channels and Modulation (Release 11)", 3GPP TS 36.211 V11.3,0, (Jun. 2013), 108 pgs.
"U.S. Appl. No. 14/134,461, Non Final Office Action mailed Jun. 19, 2015", 10 pgs.
"U.S. Appl. No, 14/134,461, Notice of Allowance mailed Oct. 9, 2015", 10 pgs.
"U.S. Appl. No. 14/134,461, Response filed Aug. 21, 2015 to Non Final Office Action mailed Jun. 19, 2015", 12 pgs.
"U.S. Appl. No. 14/135,296, Non Final Office Action mailed May 21, 2015", 10 pgs.
"U.S. Appl. No. 14/135,296, Notice of Allowance mailed Oct. 14, 2015", 10 pgs.
"U.S. Appl. No. 14/135,296, Response filed Aug. 21, 2015 to Non Final Office Action mailed May 21, 2015", 8 pgs.
"U.S. Appl. No. 15/015,348, Non Final Office Action mailed Feb. 24, 2017", 14 pgs.
"U.S. Appl. No. 15/015,348, Preliminary Amendment filed Apr. 28, 2016", 8 pgs.
"Chinese Application Serial No. 201480031473.6, Office Action mailed Oct. 25, 2016", w/English Translation, 16 pgs.
"Chinese Application Serial No. 201480031508.6, Office Action mailed Sep. 14, 2016", W/English Translation, 13 pgs.
"Discussion on scenarios and applications of NAICS", 3GPP Draft; RI-131039 NAICS High Level, 3rd Generation Partnership Project (3GPP), Mobile Competence Centre ; 650, Route Des Lucioles ; F-06921 Sophia-Antipolis Cedex ; France, [Online] retrieved from the internet: <URL:http://www.3g pp.org /ftp/tsgran/WGI RLI/ TSGRI_72b/Docs/>, (Apr. 5, 2013), 1-15.
"European Application Serial No. 14822483.5, Extended European Search Report mailed Jan. 2, 2017", 10 pgs.
"European Application Serial No. 14822925.5, Extended European Search Report mailed Feb. 17, 2017", 10 pgs.
"European Application Serial No. 16169847.7, Communication Pursuant to Article 94(3) EPC mailed Oct. 21, 2016", 7 pgs.
"European Application Serial No. 16169847.7, Extended European Search Report mailed Oct. 5, 2016", 5 pgs.
"Evaluation assumptions for network-assisted IC", Mediatek Inc, 3GPP Draft; R1-131191 Simulation Assumption for NAIC, 3rd Generation Partnership Project (3GPP), Mobile Partnership Project (3GPP), Mobile Competence Centre ; 650, Route Des, [Online] retrieved from the internet: <http://www.3gpp.org/ftp/tsg_ran/ WG1RL1/TSGR172b/Docs/>, (Apr. 6, 2013), 6 pgs.
"Interference Issues for Supporting Backward Compatibility in TDD elMTA Systems", OGPP TSG RAN WGI Meeting #72bis Chicago, (Apr. 2013), 1-20.
"International Application Serial No. PCT/US2014/045579, International Preliminary Report on Patentability mailed Jan. 21, 2016", 6 pgs.
"International Application Serial No. PCT/US2014/045599, International Preliminary Report on Patentability mailed Jan. 21, 2016", 6 pgs.
"International Application Serial No. PCT/US2014/045690, International Preliminary Report on Patentability mailed Jan. 21, 2016", 7 pgs.
"Remaining Issues for CSI Processess in TM10 with Codebook Subset Restriction", 3GPP Draft: R1-124869 Remaining Issues for CSI Processes in TM10 with Codebook Subset-V4, 3rd Generation Partnership Project (3GPP), Mobile Competence Centre 650, Route Des Lucioles ; F-06921 Sophia, [Online] retrieved from the internet: <URL:http://www.3gpp.org/ftp/tsg_ran/WGI_RLI/TSGRI_71/ Docs/>, (Nov. 2, 2012), 1-15.
"Views and evaluation on the potential gain of NAICS Receivers", 3GPP Draft; R4-132507 Views and Evaluation on the Potential Gain of NAICS Receivers Final, 3rd Generation Partnership Project (3GPP), Mobile Competence Centre ; 650, Route Des Lucioles ; F-06921 SOPHIA, [Online] retrieved from the internet: <URL:http://www.3gpp.org/ftp/tsg ran/WG4 Radio/TSGR4_67/ Docs/>, (May 13, 2013), 1-15.
"Views on network-assisted interference cancellation and suppression", 3GPP Draft; R1-131633, 3rd Generation Partnership Project (3GPP), Mobile Competence Centre ; 650, Route Des Lucioles F-06921 Sophia-Antipolis Cedex; France vol. RAN WG1, no. Chicago. USA; Apr. 15, 2013-Apr. 19, 2013, XP050697420,, [Online] retrieved from the internet: <http://www.3gpp.org/ftp/ tsgran/WG1RL1/TSGR172b/Docs/>, (Apr. 10, 2013), 9 pgs.
Ericsson, "Final Details on Codebook Subset Restriction", 3GPP Draft; R1-083745, 3rd Generation Partnership Project (3GPP), Mobile Competence Centre ; 650, Route Des Lucioles ; F-06921 Sophia-Antipolis Cedex; France, (Sep. 24, 2008).
"Chinese Application Serial No. 201480031473.6, Response filed Mar. 6, 2017 to Office Action dated Oct. 25, 2016", (W/ English Claims), 12 pgs.
"Chinese Application Serial No. 201480031508.6, Response filed Feb. 3, 2017 to Office Action dated Sep. 14, 2016", w/ English Translation, 11 pgs.
"European Application Serial No. 14823752.2, Extended European Search Report dated Mar. 13, 2017", 11 pgs.
"European Application Serial No. 16169847.7, Response filed Mar. 21, 2017 to Communication Pursuant to Article 94(3) EPC dated Oct. 21, 2016", 10 pgs.
Erik, Dahlman, et al., "4G LTE/LTE-Advanced for Mobile Broadband—Chapter 10", (Mar. 29, 2011), 61 pgs.

DEMODULATION REFERENCE SIGNALS CONTAINING SIDE INFORMATION FOR INTERFERENCE CANCELLATION

PRIORITY APPLICATION

This application is a continuation of U.S. application Ser. No. 14/109,112, filed Dec. 17, 2013, which claims priority to U.S. Provisional Application Ser. No. 61/843,826, filed Jul. 8, 2013, all of which are incorporated herein by reference in their entirety.

BACKGROUND

Inter-cell, as well as intra-cell, co-channel interference mitigation is one of the most critical tasks of the long term evolution (LTE) user equipment (UE) receiver in order to optimize downlink (DL) throughput and to minimize radio link failures. When optimizing UE receiver performance or when trading off performance against UE receiver power consumption and/or UE cost, mitigation of co-channel interference will benefit from network assistance: this means that the LTE network provides side information or coordination or both in combination in order to simplify, enable, or optimize interference cancelation (IC) or interference suppression (IS) in the UE receiver. The network assistance information is referred to as "IC/IS side information", and an assumption may be made that the (1) Modulation order and (2) Precoder information (like codebook, #TX, #Mayers, PMI) of an interfering signal is useful IC/IS side information to provide to the UE receiver. For instance: with such IC/IS side info, a maximum likelihood detector in the UE which detects resource blocks and may be capable of also demodulating the interfering signal which is falling in the allocated resource blocks of the desired UE enabling an ideally complete elimination of the UE allocation's signal improving DL throughput of the interfering UE. Research results for specific intra-cell co-channel interference from MU-MIMO use case as well as for specific instances of the Heterogeneous Network (Hetnet) use case exist. Thus, network assistance to date has been exploited in specific use cases and with rather low granularity needs. Also, the study of the principle of providing network assistance and IC/IS side information has recently been initiated.

With respect to the inter-cell and intra-cell co-channel interference case in deployment scenarios and in particular in the homogeneous macro network certain problems have neither been considered nor solved to date. For example, appropriate/efficient method(s) for signaling IC/IS side information to the LTE UE for the general inter-cell co-channel interference case have not been developed. In particular, methods meeting the signaling requirements, minimizing changes to the LTE standard and/or UE receiver implementation, and optimizing network assistance have not been addressed. Further, methods for addressing the minimization of the amount of IC/IS side information has not been developed. In particular, minimizing the amount of resources required for providing network assistance information has not been addressed, wherein gains from IC/IS side information may be undermined.

The type of interference a UE experiences may vary from PRB to PRB as well as from TTI to TTI. Furthermore, the type of interference experienced by a UE depends on the type of allocations that UEs in the neighbor cells received from their serving eNB. RAS side information must exhibit a time-frequency granularity of one PRB and one TTI currently considered infeasible using existing methods.

Network assistance to date has been exploited in specific use cases and with rather low granularity needs. Also, the principle of providing network assistance and IC/IS side info has been proposed as 3GPP Study Item currently being under consideration for LTE Rel-12 but related work has not started yet. In particular no proposals are known that address how to integrate such IC/IS side info into the LTE system in a way that requires little additional implementation and nicely fits into the standard.

Alternative solution to assisting the UE receiver consists in pre-coding and coordination by the network. For example, coordinated multipoint (COMP) transmission and reception techniques utilize multiple transmit and receive antennas from multiple antenna site locations, which may or may not belong to the same physical cell, to enhance the received signal quality as well as decrease the received spatial interference. Multiple points coordinate with each other in such a way that the transmission signals from/to other points do not incur serious interference or even may be exploited as a meaningful signal. However, CoMP has thus far provided rather disappointing outcome from overall system performance point of view.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

According to an embodiment, a method for signaling IC/IS side information to the UE for the general inter-cell co-channel interference case is provided. IC/IS side information may be considered for which the known signaling methods, e.g., wanted signal's PDCCH, wanted signal's ePDCCH, dedicated RRC messaging, wanted signal's cell broadcast, etc., are neither sufficiently accurate nor appropriate.

Figure 1:
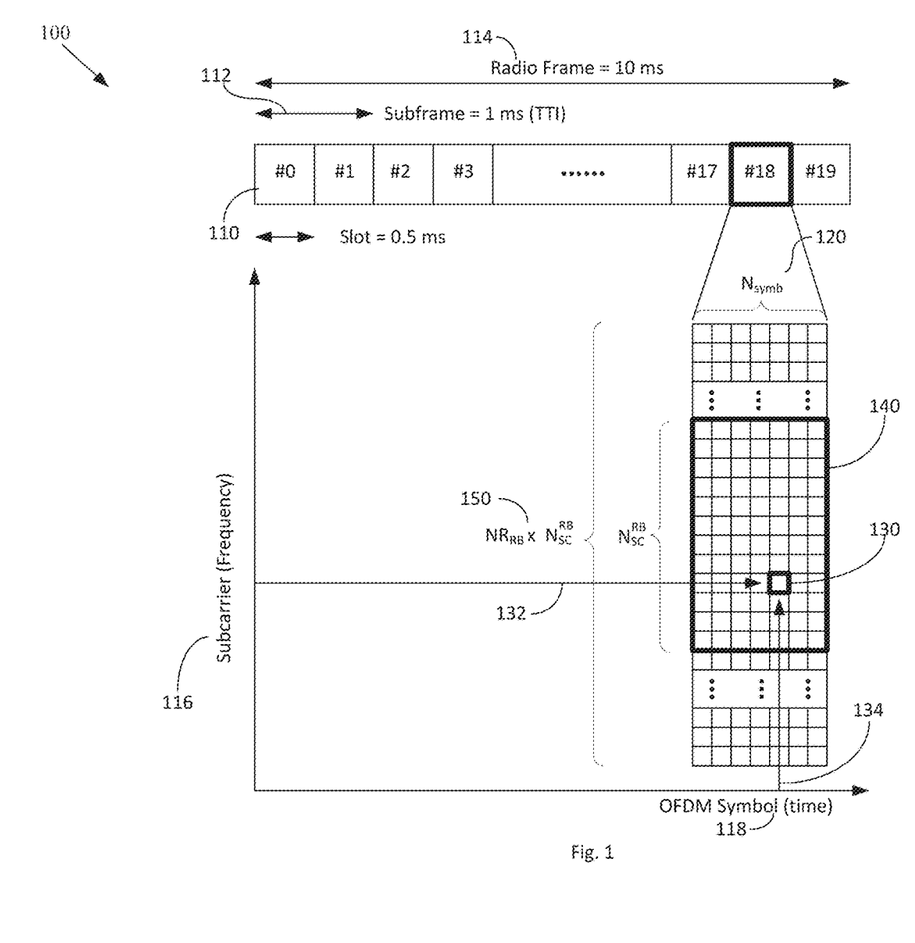
FIG. 1 illustrates a frame structure according to an embodiment.

FIG. 1 illustrates a frame structure 100 according to an embodiment. In FIG. 1, the frame 114 has an overall length of 10 milliseconds (ms). This is then divided into a total of 20 individual slots 110. Each subframe 112 includes two slots 110 of length 0.5 ms, and each slot 110 contains a number of OFDM symbols, Nsymb 120. Thus, there are 10 subframes 112 within a frame 114. Subframe #18 is shown expanded with reference to a subcarrier (frequency) axis 116 and an OFDM symbol (time) axis 118.

A resource element (RE) 130 is the smallest identifiable unit of transmission and involves one subcarrier 132 for an OFDM symbol period 134. Transmissions are scheduled in larger units called physical resource blocks (pRBs) 140 which comprise a number of adjacent subcarriers 132 for a period of one 0.5-ms timeslot. Accordingly, the smallest dimensional unit for assigning resources in the frequency domain is a "resource block" (RB) 140, i.e., a group of $N_{sc}^{RB}$ adjacent subcarriers 132 constitute a resource block (RB) 140. Each subframe 112 includes "n" resource blocks, i.e., $NRB \times N_{sc}^{RB}$ 150.

Figure 2:
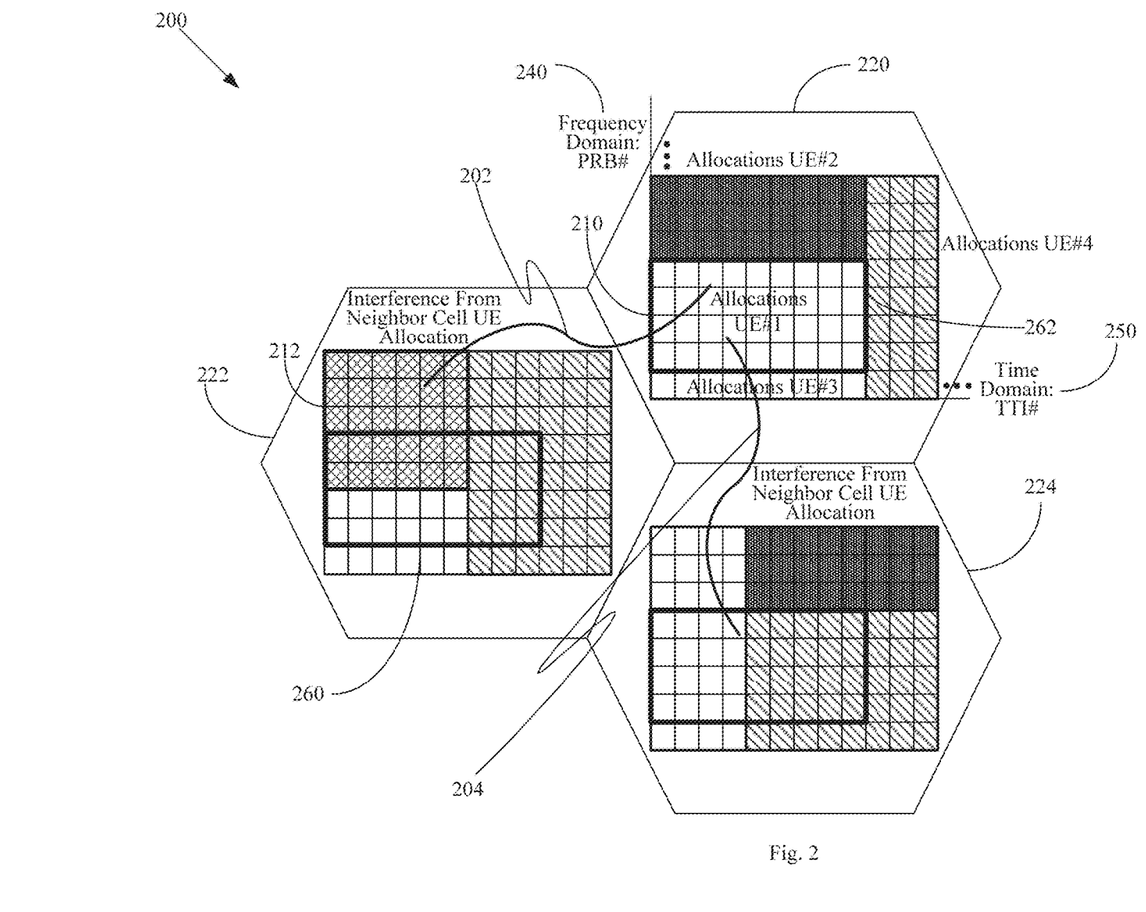
FIG. 2 illustrates a cellular network with various allocations for UEs according to an embodiment.

FIG. 2 illustrates interference varying from PRB-to-PRB as well as from TTI-to-TTI according to an embodiment. In FIG. 1, three cells are shown. Allocations of PRBs for four UEs in cell 1 are displayed, i.e., UE #1, UE #2, UE #3, UE #4. Interference from UE allocations of neighboring cell 2 and cell 3 are shown affecting allocations for UE #1 in cell 1.

FIG. 2 illustrates a cellular network with various allocations for UEs 200 according to an embodiment. FIG. 2 demonstrates that the type of interference 202, 204 experienced by a UE#1 210 in cell 1 220 depends on the type of allocations that UEs 212 in the neighbor cells, e.g., cell 2 222, cell 3 224, received from their serving eNB. The type of interference 202, 204 UE#1 210 experiences may vary from PRB to PRB 240 as well as from TTI to TTI 250. Hence, IC/IS side information must exhibit a time-frequency granularity of one PRB 240 and one TTI 250. However, this is currently considered infeasible using existing methods.

Embodiments described herein provide solutions for the required time-frequency granularity. The fine granularity requirement may be eased by requesting that neighboring cells, i.e., cell 1 220 and cell 2 222, schedule their UEs, 210, 212 in a compatible way. For example, the UE 212 in cell 2 222 with allocation 260 may schedule, within its serving cell 222, either the same allocation 262 as UE#1 210 provided in cell 1 220. However, this will prohibit optimal scheduling of the UE 212 in cell 2 222 because using the same allocation 262 as UE#1 210 provided in cell 1 220 may be too large, may be too small or may not have optimally fitting allocations for PRBs 240 or TTIs 250. Such scheduling restrictions may cause serious performance degradation in terms of system capacity.

There are two types of reference signals for uplink in LTE. The first is Sounding Reference Signal (SRS) which is used to allow channel dependent (i.e. frequency selective) uplink scheduling. The second is Demodulation Reference Signals (DMRS) which, according to an embodiment, are used to enable coherent signal demodulation at the eNB.

Figure 3:
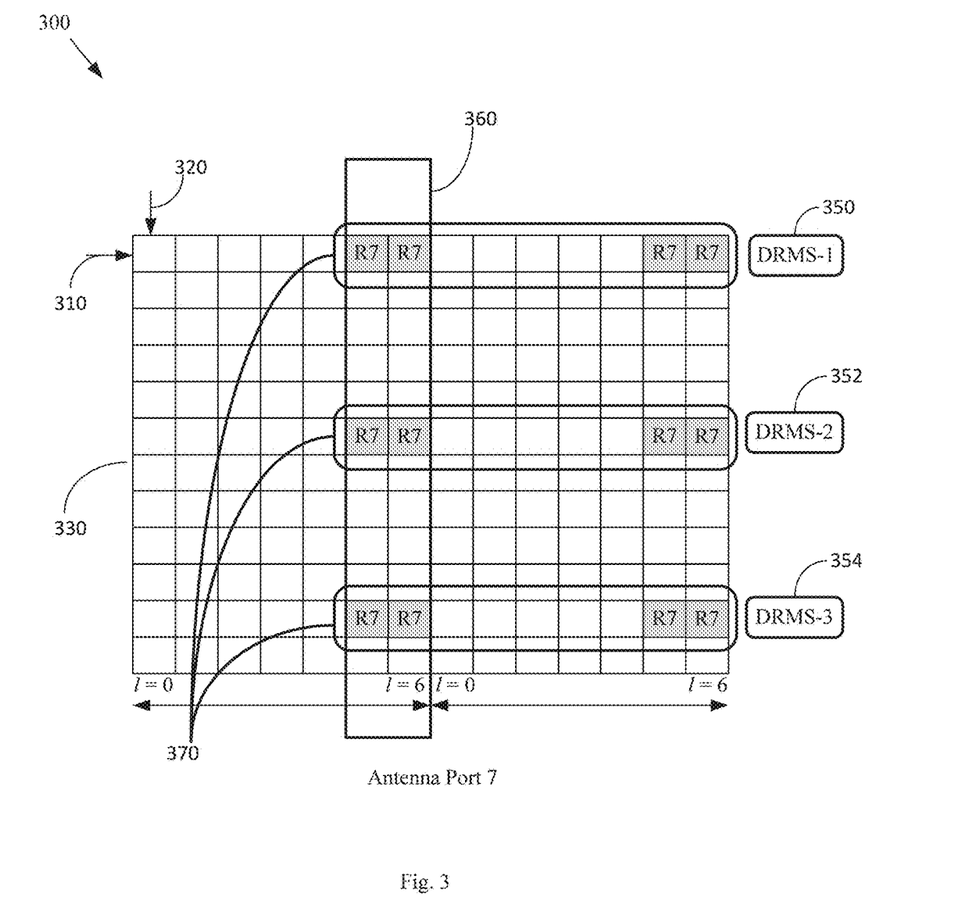
FIG. 3 illustrates DRMS for providing side information according to an embodiment.

FIG. 3 illustrates DRMS for providing side information 300 according to an embodiment. In FIG. 3, placement and modulation of DMRS for antenna port 7 on the grid of subcarriers 310 and OFDM symbols 320 within a Resource Block 330. DMRS are reference signals that are precoded in a specific way, typically to achieve better signal at the desired UE, e.g., by using beam forming and combining the signals of multiple antennas in calculated manner. Accordingly, any number of antennas may be used to achieve a good reception signal at the UE without a need to perform channel estimations on each of the involved antennas, but only on the compound signal via the DMRS. This principle may be exploited both for inter-cell and intra-cell interference.

In FIG. 3, each quadruplet, or 4, DMRS, DMRS-1 350, DMRS-2 352, DMRS-3 354, which are transmitted on the same subcarrier (row) 310 are grouped into a set to obtain three :DMRS sets/quadruplets labeled DMRS-1 350, DMRS-2 252 and DMRS-3 354. Then, one DMRS set is transmitted unchanged, e.g., DMRS-2 252, but an additional modulation is introduced on DMRS-1 350. Different types of scrambling may be applied on the individual DMRS as shown below. However, application of different types of scrambling on the individual DMRS may be omitted without departing from the teachings of embodiments described herein. The modulation may be the same CM DMRS within a set, the modulation does not affect the CDMA component used to distinguish DMRS on different antenna ports.

Normally, DMRS are intended for the intended UE's channel estimation. According to an embodiment, DMRS is used both for channel estimation (for the interfering UE and the interfered UEs) and for indicating side-information about the interfering signal also to the interfered UEs. With the help of such side information the interfered UE, e.g., UE#1 210 shown in FIG. 2, may more efficiently cancel (or jointly demodulate) the interfering UEs signal, e.g., the interfering signal 202 from UEs in cell 2 222 and the interfering signal 204 from cell 3 224, as shown in FIG. 2.

Channel state information or channel status information (CSI) is information which represents the state of a communication link from the transmit source(s) to the receiver source(s). This information describes how a signal propagates from the transmitter to the receiver and represents the combined effect of, for example, scattering, fading, and power decay with distance the Channel state information (CSI) may also be referred to as side information, which may be available at the transmitter (CSIT) or at the receiver (CSIR) or at both ends. Side information may include feedback used to control certain parameters of a communication channel.

DMRS are typically sent in a "beam-formed way" and thus cover part of the cell. If the interference is strong, so is the received signal strength of the DMRS and vice versa. That means that the side information is easy to detect, i.e., the DMRS received is strong, when the interference is strong. Thus, cancellation of that particular signal is very valuable. When the DMRS is received marginally, the side-information may be impossible to decode. However, the interference is not strong either and thus canceling the interfering signal may not be performed.

In FIG. 3, there are up to 24 REs 360 on which DMRS on up to 8 layers are sent, e.g., partly TDM and CDMA coded. This leaves 24/8=3 independent samples 370. These samples are redundant and, respectively, the samples are used to track time/frequency dependent channels. When the channel is sufficiently flat in the frequency domain, e.g., when there are no echoes with long delays such as typically occurs for small cells, information may be coded into these three samples 370. For example, a phase shift of two of the three samples 370 relative to the remaining one of the three samples may be introduced to indicate properties of the transmission, such as the most likely modulation scheme, e.g., three values representing QPSK, 16QAM, 64QAM, 256QAM, etc.

The interfering UE may be aware of this signaling, and is also aware of the information coded therein because this information is also sent on a (e)PDCCH, and therefore the UE may take this into account for the DMRS processing, e.g., an additional scrambling, which depends on the applied modulation scheme that is applied. Then there is no impact, e.g., performance wise, on that UE. If the UE is a legacy UE, the UE thinks the channel is frequency/time dependent and will thus apply that channel also to the data. The data-detection would be processed incorrectly because the channel is estimated incorrectly. However, the data may also be distorted with a channel that has exactly the frequency/time variance that is apparently indicated by the DMRS. The legacy UE may thus detect the data correctly. For sake of simplicity, this pre-distortion may be applied for both legacy and new UEs, wherein the new UEs may be aware of the pre-distortion of both the DMRS and data and may therefore be used to perform even more sophisticated channel tracking. The differences between the apparent channel measured on these distorted DMRS and cell-specific reference signal (CRS) are not a concern because UEs may assume that the channel experienced on DMRS differs from the "general" channel seen on CRS, and, in particular, the UEs are not allowed to average between CRS and DMRS estimates.

The side-information is sent per layer, whether the layers are for the same UEs, for single user MIMO, or for different UEs, e.g., for multi user MIMO. The interfered UE cancels the layers for which the interfered UE may receive the DMRS with accuracy and cancels those, no matter for whom the data is intended. This provided full flexibility regarding scheduling at the eNB and limits the amount to be signaled per layer. When one UE is served with multiple layers, e.g., with single user MIMO, then the modulation may be different from layer to layer.

There may be two transport blocks using different modulation, but the two transport blocks are mapped to layers in a way that there is no mixing of modulation within a single layer. Therefore, according to an embodiment, the modulation may be indicated independently for each layer. In case of multi user MIMO, different UEs may use different modulations, but again a single layer supports a single modulation scheme.

The modulation scheme may be coded, e.g., QPSK, 16QAM or 64QAM (three values). This may be indicated by applying a phase rotation, for example, by applying a simple multiplication by −1 or exp(j*alpha) at one quadruple of the three independent quadruples of DMRS. Accordingly, three pieces of information are coded onto two constellations, wherein the third is used as a channel reference.

Table 1 illustrates an example modulation. The modulation shown in Table 1 may be referred to as symmetric. The angle α indicates the phase shift that is achieved by multiplying affected DMRS with exp(+jα) or exp(−jα). In Table 1, the modulation applied to the sets/quadruplets of DMRS for 3 different coded side information examples. For 64 QAM, DMRS1, DMRS2 and DMRS3 have no modulation applied. For 16 QAM, DMRS1 and DMRS3 are multiplied with exp(+jα), whereas DMRS2 is not modified. QPSK, DMRS1 and DMRS3 are multiplied with exp(−jα), whereas DMRS2 is not modified.

TABLE 1

| Side Information | Modulation Applied to the Sets/Quadruplets of DMRS | | |
|---|---|---|---|
| To Signal | DRMS1 | DRMS2 | DRMS3 |
| 64 QAM | None | None | None |
| 16 QAM | exp(+j α) | None | exp(+j α) |
| QPSK | exp(−j α) | None | exp(−j α) |

Table 2 illustrates a second example modulation. The modulation shown in Table 1 may be referred to as un-symmetric. In Table 2, for 64 QAM, DMRS2 and DMRS3 have no modulation applied. For 16 QAM, DMRS1 is multiplied with exp(+jα) and DMRS3 is multiplied with exp(−jα), whereas DMRS2 is not modified. For QPSK, DMRS1 is multiplied with exp(+jα) and DMRS3 is multiplied with exp(−jα), whereas DMRS2 is not modified.

TABLE 2

| Side Information | Modulation Applied to the Sets/Quadruplets of DMRS | | |
|---|---|---|---|
| To Signal | DRMS1 | DRMS2 | DRMS3 |
| 64 QAM | None | None | None |
| 16 QAM | exp(+j α) | None | exp(−j α) |
| QPSK | exp(−j α) | None | exp(+j α) |

The performance of cancelling concurrent transmissions for other UEs may improve if more side-information on those transmissions are available. The interfered UE may take this side information into account on top of the other information the interfered UE may infer, e.g., by blind detection. Because the intended UEs know the modulation applied on the DMRS, the UEs may take the known modulation into account, e.g., similar to the already existing scrambling r, as described below. Legacy UEs may suffer some degradation, but it is possible to inhibit the feature for legacy UEs thereby allowing a backward compatible introduction.

Thus, according to embodiments, DMRS, i.e., precoded reference signals sent per layer to a UE to convey side information about that transmission, is used to help an interfered UE to more easily cancel this interference. This provides double use of the DMRS reference signals. The side information may be encoded by modulating these reference signals, e.g., by introducing a phase-shift, or also amplitude modulation, on some of the DMRS.

The interfered UE may be served by an adjacent cell or in the case of MU-MIMO, the interfered UE may also be a UE in the same cell but served on different layers. For example, the layers are typically not ideally orthogonal, therefore other UEs layers may be canceled.

Figure 4:
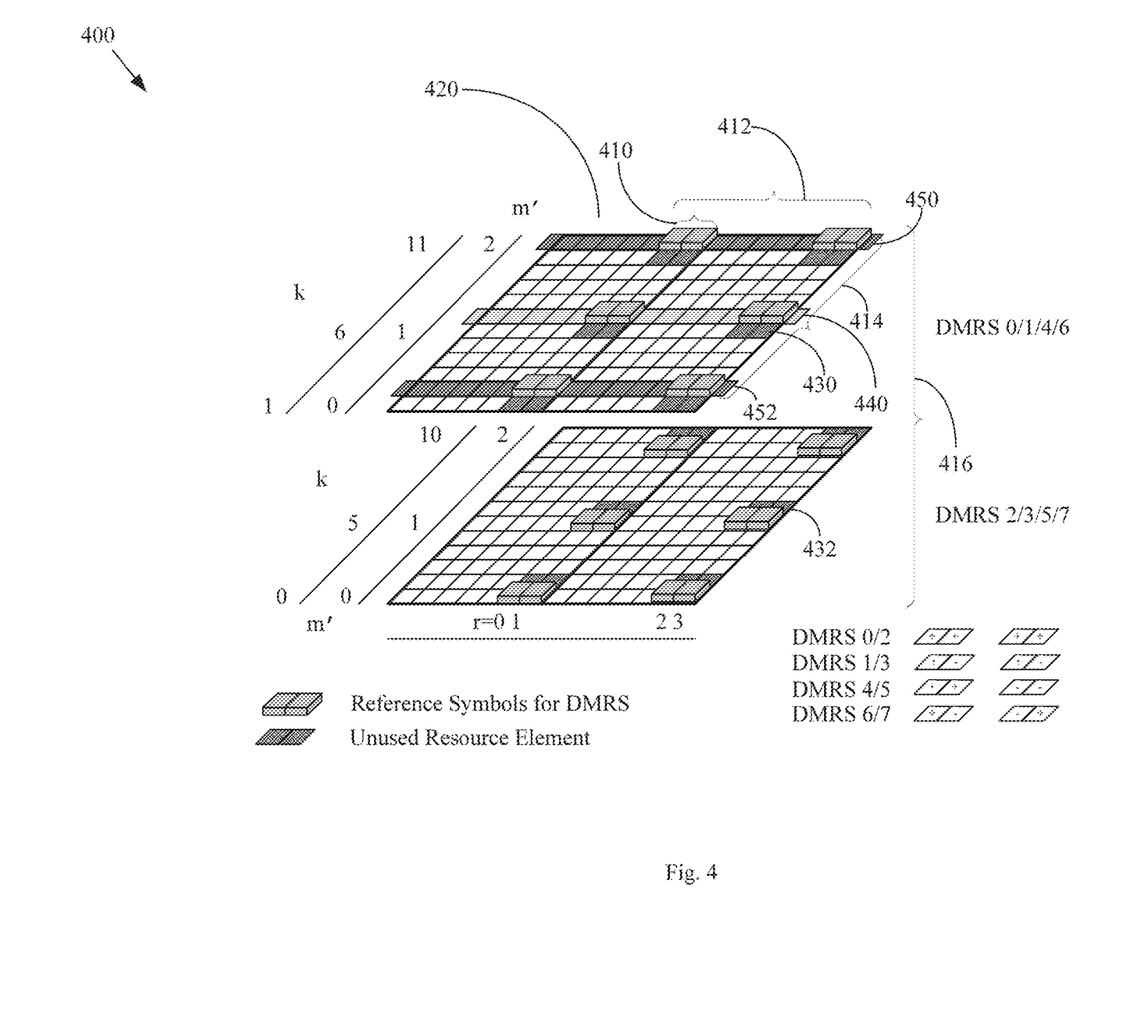
FIG. 4 illustrates DMRS used for more than two layers according to an embodiment.

FIG. 4 illustrates DMRS used for more than two layers 400 according to an embodiment. In FIG. 4, there are 2 (a pair of DMRS 410)*2 (2 pairs per DMRS set 412)*3 (3 DMRS sets of 4 DMRSs in a layer 414)*2 (2 layers 416)=24 REs reserved for DMRS transmission. DMRS may be used to convey channel estimates for up to 8 layers. With 1 or 2 layers per user, there are 12 DMRS REs, e.g., the upper DMRS 420, but the same argument applies. The different layers are distinguished via FIDM, e.g., upper vs. lower level. Resources used on one level are not used in the other, but rather are blanked 430, 432 on the other. CUM codes are applied on quadruples of RS in the time domain. These patterns are also called Orthogonal Cover Codes (OCC), e.g., the patterns may be orthogonal CDMA codes. In the frequency domain, there are three such quadruples for each layer 414.

in FIG. 4, a complex valued modulation symbol is defined as $a_{k,l}^{(p)} = \omega_p(l') \cdot r(3l'N_{RB}^{max,DL} + 3n_{PRB} + m')$, wherein k is a subcarrier index (within PRB), where ports 7, 8 (2 layers), 11, 13 are mapped to k=1, 6, 11, and ports 9, 10, 12, 14 are mapped to k=0, 5, 10, wherein l is a symbol index, l=0-6, where 4 DMRS REs per TTI indexed by l'=0, 1, 2, 3, wherein p is the antenna port, and wherein r( ) is the reference signal sequence.

Table 3 illustrates the sequence for cyclic prefix according to an embodiment. For antenna ports, in a physical resource block with frequency-domain index $n_{PRB}$ assigned for the corresponding PDSCH transmission, a part of the reference signal sequence r(m) may be mapped to complex-valued modulation symbols in a subframe according to $a_{k,l}^{(p)}=\omega_p(l')\cdot r(3l'N_{RB}^{max,DL}+3n_{PRB}+m')$.

TABLE 3

| Antenna port $p$ | $[\bar{w}_p(0)\ \bar{w}_p(1)\ \bar{w}_p(2)\ \bar{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

If the channel is sufficiently flat in the frequency domain, then the three quadruples 414 provide the same information, and this fact may be used to code information. For example, the middle quadruplet DMRS set 440 may be considered as a reference, i.e., transmit the middle quadruplet DMRS set 440 without any modification. However, on the other two quadruplet DMRS sets 450, 452, a small phase shift may be applied, e.g., in the order of alpha=1/8*2 or even less. In this way, three different values may be conveyed by applying a positive phase shift, a negative phase shift or a zero phase shift, i.e., no change at all.

Additionally, DMRS may be scrambled with a pseudo-random cell-specific sequence r( ) that is known to UEs, who also know the cell ID, which may thus easily be taken into account by the intended and interfered UEs. However, for MU-MIMO use cases, and maybe also for SU-MIMO with a maximal of two layers, there are two scrambling variants of the sequence r( ) which are quasi-orthogonal. The different scrambling ($n_{SCID}$=0 or 1) is signaled in the downlink control information (DCI) to the intended UE and is not readily available to interfered UEs. For other layer configurations, e.g., SU-MIMO with more than 2 layers, only the scrambling variant with $n_{SCID}$=0 exists. Via these quasi-orthogonal random sequences, some separation may be achieved in case multiple terminals are scheduled on the same resources, e.g., on PRBs and antennas ports/layers using MU-MIMO. The sequencer is a binary complex sequences, i.e., the elements, ignoring a scaling factor, have the four complex values ±1 ±j. If UEs need to be scheduled with the other sequence ($n_{SCID}$=1), the interfered UE does not necessarily know the sequence r and may fail to detect the information sent on DMRS, and may also fail to obtain the DMRS based channel estimation, wherein the signals from these legacy UEs cannot then be cancelled. Alternatively, the interfered UE may be able infer the sequencer r by looking at three quadruplet DMRS sets 440, 450, 452. The interfered UE may apply both alternatives and pick the one that achieves a higher average power of the de-spread DMRS. Where MU-MIMO is employed in the interfering cell and both sequences are used for different UEs, the interfered UE will pick the stronger interfering signal, which is probably the best alternative. If both signals are equally strong, which means that indistinguishable transmissions for two UEs overlap and interfere, then it may be difficult to perform a meaningful cancellation because the interfering signal approaches Gaussian noise.

If the different modulation schemes have different a priori probabilities, then the phase angles may be set accordingly, i.e., to make sure that commonly used schemes are well separated. Additionally, if the different schemes may also be blindly detected, e.g., using non-perfect probability, then the detection probability may also be used to set the phase angles. Better discrimination may be provided amongst modulations that cannot be discriminated reliably otherwise, but similar or even the same encoding may be applied for two schemes that may be blindly distinguished easily.

The powers of the DMRS quadruples may also be modified—not merely the phases. This may have some impact on channel estimation accuracy, e.g., it may be worse on the low power DMRS, but allows more data to be signaled to the interfered UEs.

No matter which UEs are scheduled in consecutives PRBs, i.e., there is no scheduling restriction on the PRBs. However the receiving UE may gamble on consecutive scheduling and then take information of consecutive PRBs into account, thus increasing the coding gain by using DMRS sets 440, 450, 452 consecutively, instead of using 3 quadruplet DMRS sets independently 440, 450, 452 twice. This could be enhanced if side information providing information about the granularity of scheduling in the interfering cell is given to the interfered UE, e.g., via semi-static signaling. Even if this information is not available, the UE may detect low quality when decoding DMRS of individual PRBs. Then, the UE may try to combine multiple DRMS. If the multiple DRMS being combined have different modulation schemes, the quality will stay low. However, if the multiple DRMS being combined use the same modulation scheme, some gain is obtained and then the UE may detect with a selected quality.

For legacy UEs, the manner in which the de-spreading of the OCC is accomplished may not be known, i.e., it may not be known whether quadruples of DMRS REs are de-spread individually or whether the legacy UE takes other sets for the de-spreading. If the UE selects "wrong" sets, the de-spreading may suffer degradations. The reception processing is not prescribed, just the sent signal. Any redundancy is allowed to be exploited by the receiver. If the distortion is restricted, e.g., to a small phase shift, then the impact may be less severe and excessive impact on legacy UEs may be avoided. This is not an issue for new UEs because new UEs are aware of the mechanism.

A reduced impact on legacy UEs may be provided using smart coding scheme. A legacy UE may suffer some degraded channel estimation if the legacy UE tries to do some smart channel interpolation between the different DMRS samples. While a corresponding interpolation on the transmitted data may also be performed, different UEs may use slightly different interpolation algorithms causing some deviations. This is equivalent to adding some noise. Additional noise is most severe for high modulation schemes, e.g., 64 QAM (or 256 QAM if used). The coding may be selected in a way that for the highest modulation scheme there is no deviation from the legacy DMRS modulation, i.e., the phase shift alpha is zero, and for lower schemes is a phase shift introduced. This shift may be increase for lower and lower modulation schemes or an increasing number of DMRS quadruplets may be affected.

Furthermore, the manner in which the legacy UE treats the apparent phase shift in the frequency domain is unknown. Because there are only the quadruplet DMRS sets 440, 450, 452 per PRB, there are basically three options. The channel may be assumed to be frequency flat and therefore may be averaged over three quadruplet DMRS sets 440, 450, 452, e.g., the channel may be assumed to change linearly with frequency and therefore a linear approximation may be applied. The channel change may be assumed to be more complex than a linear change. Because there are three samples, a quadratic approximation or similar approximation may be performed. Some coding schemes perform well for more than one of these options. These schemes may be used for cases that are likely to be used by legacy UEs.

Figure 5:
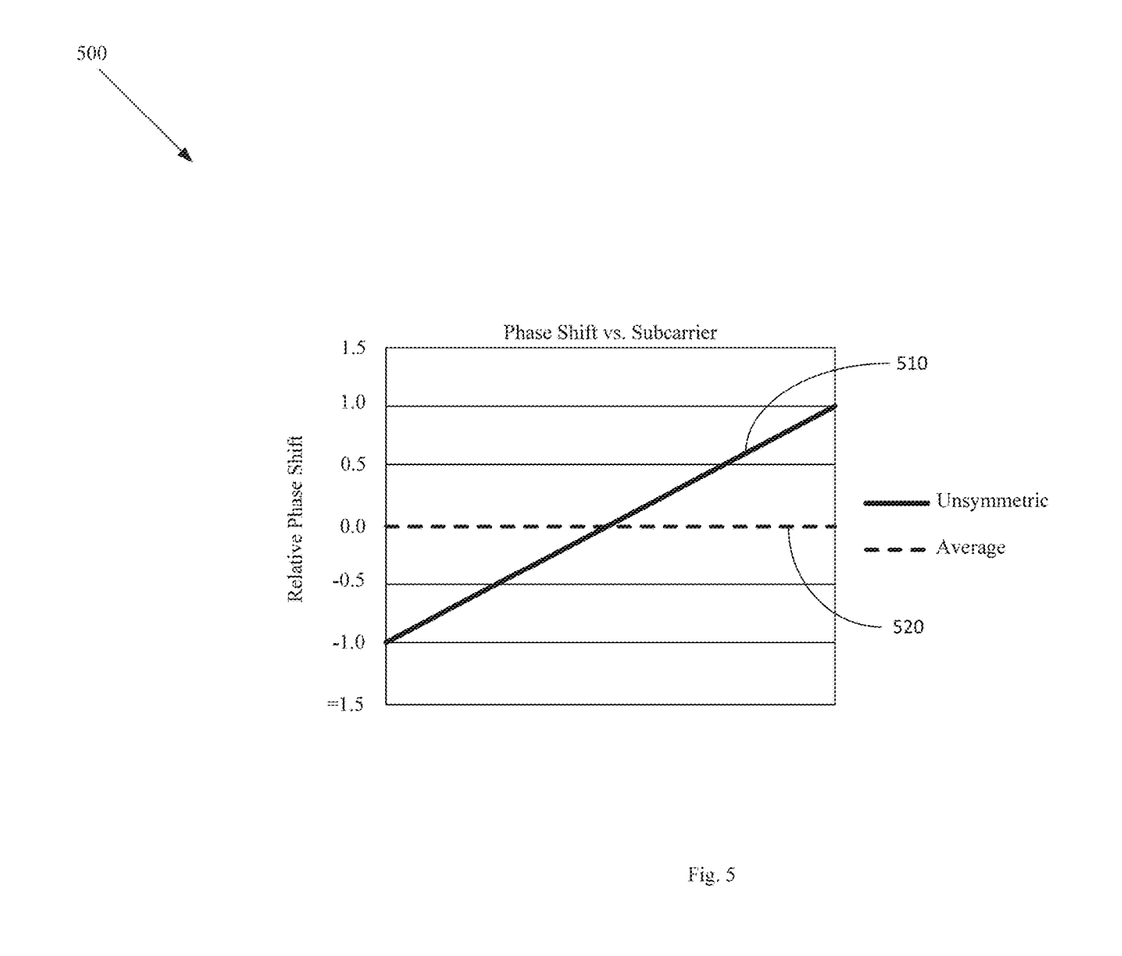
FIG. 5 illustrates a comparison of the relative phase error for un-symmetric modulation approximation versus average approximation according to an embodiment.

FIG. 5 illustrates a comparison of the relative phase error for un-symmetric modulation approximation versus average approximation 500 according to an embodiment. In FIG. 5, for un-symmetric modulation, the phases of the DMRS at the edges are modulated with opposite signs as represented by line 510. The same result, i.e., the solid line 510, is provided for both the linear and quadratic approximation, while for average approximation 520, a deviation that may be quite large at the edges may result.

Figure 6:
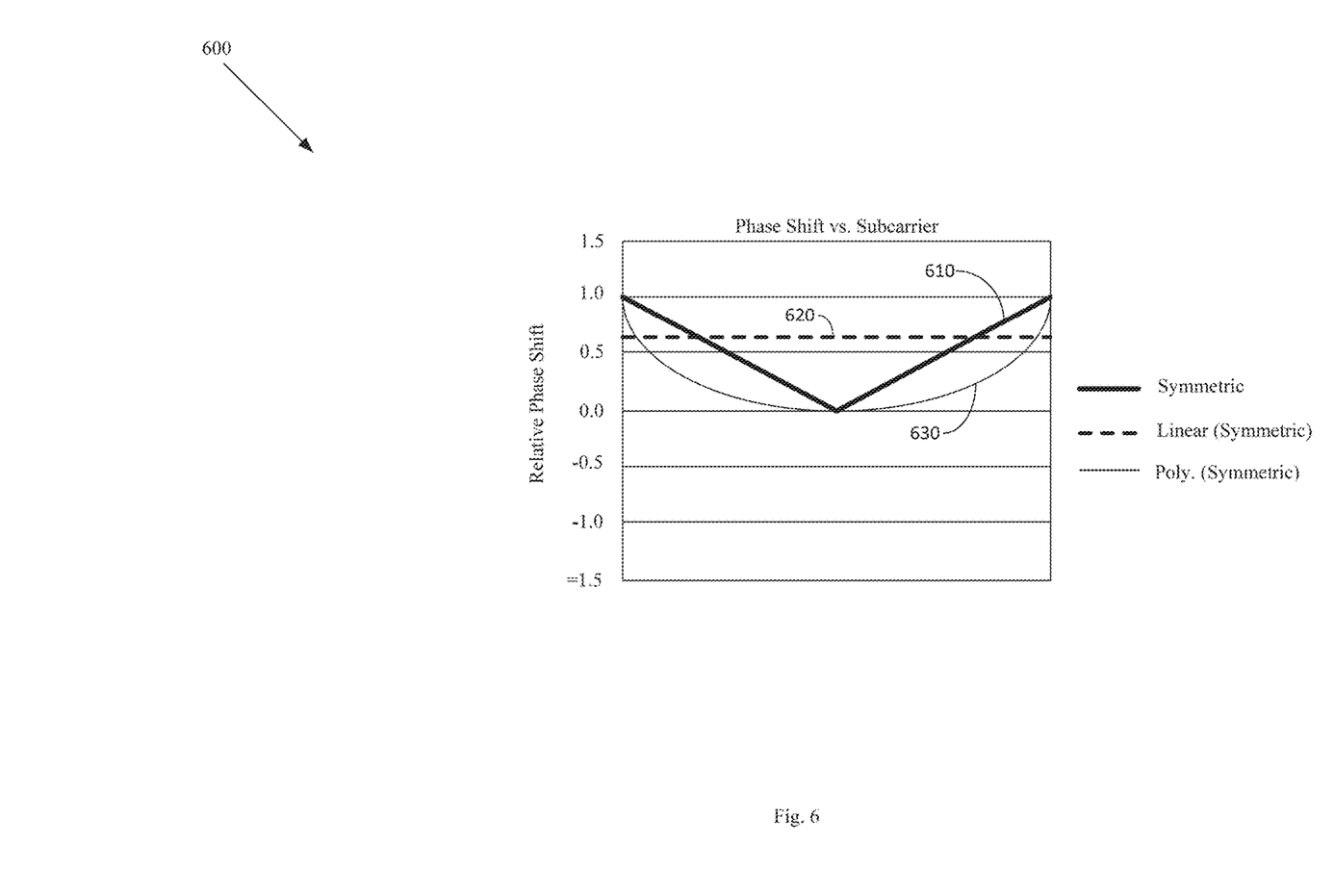
FIG. 6 illustrates a comparison of the relative phase error for symmetric modulation approximation versus average approximation according to an embodiment.

FIG. 6 illustrates a comparison of the relative phase error for symmetric modulation approximation versus average approximation 600 according to an embodiment. In FIG. 6, the same sign of the phase modulation is used at the edges as represented by line 610. Here both the linear and average approximations, e.g., the dashed line 620, give the same result, but quadratic approximation differs 630. The maximum deviation is smaller than shown in FIG. 5, thus this modulation may be a more robust coding. This modulation may be applied for medium modulation, i.e., 16 QAM, while the previous one may be applied for QPSK which is most robust.

The type of approximation may also depend on the perceived channel properties, i.e., whether the channel seems to have a high or low correlation in the frequency domain, and may also depend on the population of legacy UEs, e.g., different manufacturers or models may implement different algorithms. The base station may adapt the signaling based on at least one of the population of UEs, the channels they are experiences, the predominantly used modulation schemes. The relation between coding and used modulation is not fixed, but may be conveyed by the base station both to non-legacy UEs in the own cell and to UEs in other cells via semi-static signaling, e.g., BCCH, dedicated messages and X2 interface to neighboring cells.

Backward compatible coding may be provided to circumvent degradation for legacy UEs. The legacy DB-RS settings may be used to indicate that no side information is available. Then, four values may be used to signal (QPSK, 16QAM, 64QAM or legacy) and the code may be selected in a way that "legacy" is identical to legacy DMRS. Accordingly, it is possible to avoid impact on all or a selection of the legacy UEs. At the same time the advantage is sacrificed as well, but no degradation is generated. This may be combined with using legacy DMRS settings for 64QAM. At a given receive strength, cancellation of 64QAM typically gives less gain than cancellation of a lower modulation scheme because it is harder to detect the constellations of 64 QAM. Therefore 64QAM and legacy are indicated in the same way, e.g., no change to the legacy DMRS.

Forward looking coding may be provided when backward compatibility is not an issue, e.g., no legacy UEs to schedule, at least on some resources/carriers. The modulation scheme may also be signaled to the intended UE to save some bits on the (e)PDCCH, e.g., semi-public signaling of scheduling as a first partial step towards a system that has fully public scheduling. This may be a general concept, independent of DMRS usage. Further, this may be implemented if DMRS is used as a reference for ePDCCH because otherwise a circular cause and consequence situation occurs, such as the causality dilemma of the chicken and egg, since the ePDCCH content is used when using the DMRS, but channel estimation from DMRS is used to decode ePDCCH. The CRC however may still be performed on the full information, thus also confirming the correctness of the modulation detection via DMRS. Extra additional CRC or redundancy is not used to transmit on DMRS and any misdetection is avoided, or at worst the transmission is lost. However, due to the use of little coding, this may not be an attractive option.

Embodiments described herein are applicable not only for PDSCH (data channel) but for the ePDCCH as well: The ePDCCH is transmitted on specific PRB pairs and uses DMRS specific to these PRB. QRSK may be used as a modulation scheme. This may be indicated via the DMRS, then interfered UEs may cancel the ePDCCH as well. The UEs may not be aware whether ePDCCH or data is sent on a particular PRB.

Thus, according to embodiment described herein. DMRS sets 350, 352, 354 such as shown in FIG. 3 may be used to provide both channel estimate and side information. This may be accomplished by slightly modifying the legacy DMRS. However, new SI-RS (side information RS) may be introduced. SI-RS may be used primarily to convey side information to inferred UEs. The SI-RS may be coded similarly to the DMRS and contain side-information. After decoding the side information, the IS-RS may be used to enhance channel estimation, and the intended UE, which knows the side information, may use the IS-RS immediately for channel estimation. These IS-RS may not be backwards compatible.

Figure 7:
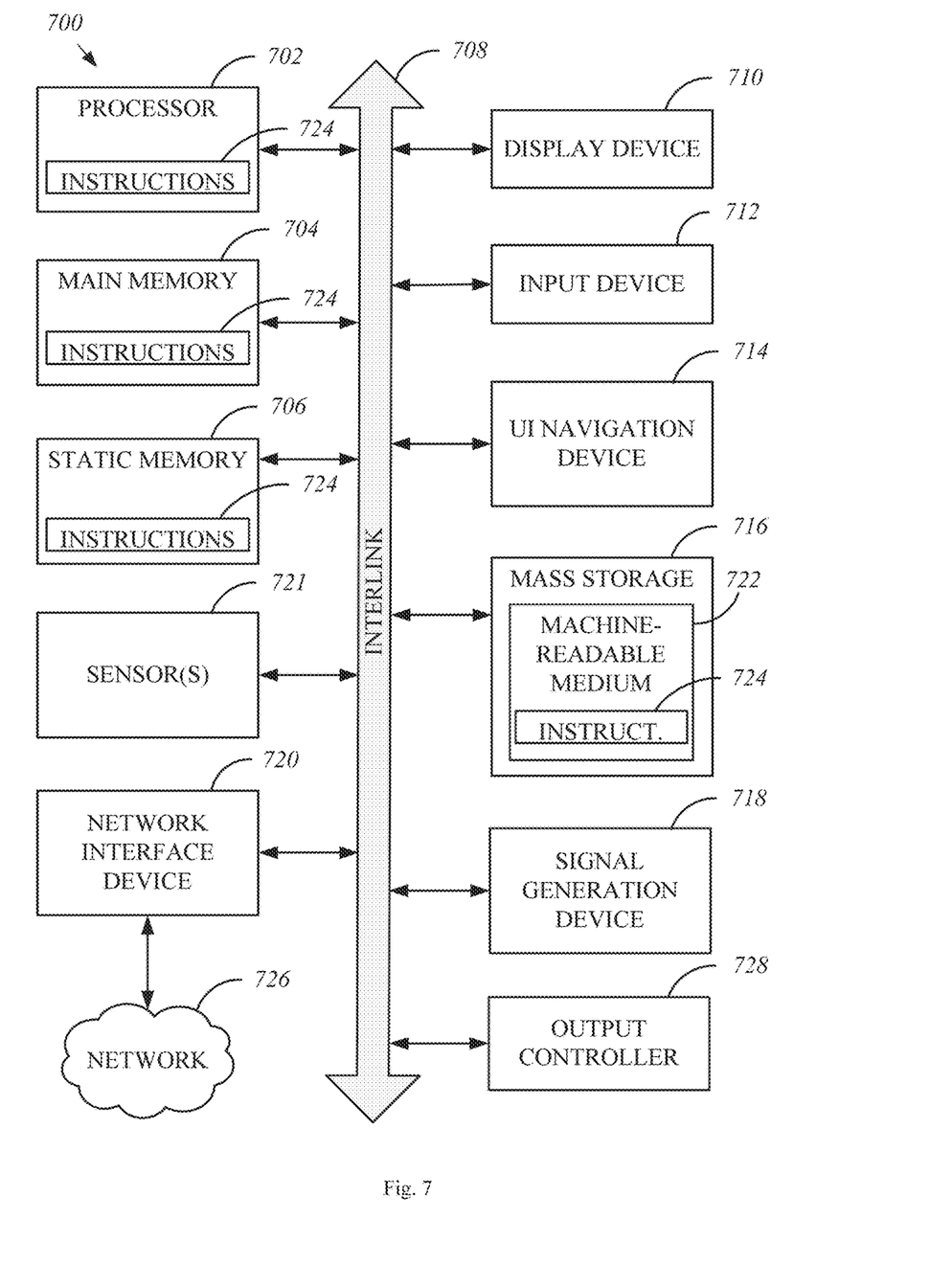
FIG. 7 illustrates a block diagram of an example machine for providing demodulation reference signals to provide side information for interference cancellation according to an embodiment.

FIG. 7 illustrates a block diagram of an example machine 700 for providing demodulation reference signals to provide side information for interference cancellation according to an embodiment upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine and/or a client machine in server-client network environments. In an example, the machine 700 may act as a peer machine in peer-to-peer (P2P) (or other distributed) network environment. The machine 700 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 702 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 702 configured using software; the general-purpose hardware processor may be configured as respective different modules at different times. Software may accordingly configure a hardware processor, for example, to constitute a particular module at one instance of time and to constitute a different module at a different instance of time. The term "application.," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 700 may include a hardware processor 702 (e.g., a central processing unit (CPU), a graphics processing unit (GPU), a hardware processor core, or any combination thereof), a main memory 704 and a static memory 706, at least some of which may communicate with others via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and U1 navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR)) connection to communicate or control one or more peripheral devices (e.g., a printer, card reader, etc.).

The storage device 716 may include at least one machine readable medium 722 on which is stored one or more sets of data structures or instructions 724 (e.g., software) embodying or utilized by any one or more of the techniques or functions described herein. The instructions 724 may also reside, at least partially, additional machine readable memories such as main memory 704, static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) that configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects. The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. At least one non-transitory machine-readable medium containing instructions that, when executed by a processor of a communication device, cause the processor to perform operations for using demodulation reference signals to provide side information for interference cancellation, the operations comprising: preparing a sub-frame comprising two slots and configuring a physical resource block (PRB) for each slot, wherein each PRB comprises a plurality of subcarriers for transmitting a plurality of symbols per slot; allocating, in resource elements on each of three of the plurality of subcarriers, two pairs of demodulation reference signals (DMRS) to form three DMRS sets, the DMRS sets comprising known sequences; mapping symbols with a first modulation for the two pairs of demodulation reference signals to three of the plurality of subcarriers for transmission; and adding a second modulation to a first of the three DMRS sets and adding a third modulation to a second of the three DMRS sets to indicate side information regarding an interfering signal for use in mitigating the interfering signal, wherein the first modulation, the second modulation, and the third modulation encode the side information, and wherein the side information is distinct from the known sequences.

2. The at least one non-transitory machine-readable medium of claim 1, wherein the operation of adding the second modulation to the first of the three DMRS sets and the third modulation to the second of the three DMRS sets comprises adding a same modulation to the first and second of the three DMRS sets, the second modulation being the same as the third modulation.

3. The at least one non-transitory machine-readable medium of claim 1, wherein the operation of adding the second modulation to the first of the three DMRS sets and the third modulation to the second of the three DMRS sets comprises adding a different modulation to the first and the second of the three DMRS sets, the second modulation being different than the third modulation.

4. The at least one non-transitory machine-readable medium of claim 1, wherein the operation of adding the second modulation to the first of the three DMRS sets and the third modulation to the second of the three DMRS sets further comprises providing side information to the three DMRS sets to support channel estimation for an interfering user equipment (UE) and for an interfered UE.

5. The at least one non-transitory machine-readable medium of claim 1, wherein the operation of adding the second modulation and adding the third modulation for use in mitigating the interfering signal provides side information for canceling the interfering signal.

6. The at least one non-transitory machine-readable medium of claim 1, wherein the operation of mapping symbols with a first modulation for the two pairs of demodulation reference signals to the three OFDM subcarriers for transmission comprises selecting three pairs of resource elements from twenty-four resource elements in a first physical resource block and selecting three pairs of resource elements from twenty-four resource elements in a second physical resource block to use for the three DMRS sets, wherein the three pairs of resource elements in the first physical resource block and in the second physical resource block are aligned with three subcarriers.

7. The at least one non-transitory machine-readable medium of claim 1, wherein the operation of adding the second modulation and the third modulation for use in mitigating the interfering signal further comprises coding information for the three DMRS sets using a phase shift on the first and the second of the three DMRS sets relative to a third of the three DMRS sets to indicate properties of the transmission, wherein the coded information is further sent to an interfered UE on a data channel.

8. The at least one non-transitory machine-readable medium of claim 1 further comprising instructions for applying pre-distortion to data and to the pairs of DMRS for use in performing channel tracking.

9. The at least one non-transitory machine-readable medium of claim 1, wherein the operation of adding the second modulation to the first of the three DMRS sets and adding the third modulation to the second of the three DMRS sets further comprises applying one modulation technique selected from a group consisting of introducing a phase-shift and applying amplitude modulation on the first and the second of the DMRS sets.

10. The at least one non-transitory machine-readable medium of claim 1, wherein the operation of adding the second modulation to the first of the three DMRS sets and applying the third modulation to the second of the three DMRS sets comprises applying a symmetric modulation to the first of the DMRS sets and to the second of the DMRS sets, wherein the symmetric modulation comprises applying one phase shift selected from a group consisting of applying a positive phase shift to the first and the second of the three DMRS sets and applying a negative phase shift to the first and the second of the three DMRS sets.

11. The at least one non-transitory machine-readable medium of claim 1, wherein the operation of adding the second modulation to the first of the three DMRS sets and applying the third modulation to the second of the three DMRS sets comprises applying an un-symmetric modulation to the first of the three DMRS sets and to the second of the DMRS sets, wherein the un-symmetric modulation comprises opposite phase shifts to the first and the second of the three DMRS sets.

12. The at least one non-transitory machine-readable medium of claim 1 further comprising instructions for providing a first layer comprising a first three DMRS sets and providing a second layer comprising a second three DMRS set, wherein the adding the second modulation and adding the third modulation comprises adding the second modulation to a first of the three DMRS sets in the first layer and to a first of the three DMRS sets in the second layer and adding the third modulation to a second of the three DMRS sets in the first layer and to a second of the three DMRS sets in the second layer.

13. The at least one non-transitory machine-readable medium of claim 1, wherein the operation of adding the second modulation to the first of the three DMRS sets comprises providing a same phase shift to the pairs of DMRS in one of the three DMRS sets.

14. The at least one non-transitory machine-readable medium of claim 1, wherein the operation of adding the second modulation to the first of the three DMRS sets comprises providing a first DMRS and a second DMRS forming a first pair of DMRS in one of the three DMRS sets with an opposite phase shift and providing a third DMRS and a fourth DMRS forming a second pair of DMRS in one of the three DMRS sets with a phase shift equal to the phase shift of the first and second DMRS, respectively.

15. The at least one non-transitory machine-readable medium of claim 1, wherein the operation of adding the second modulation to the first of the three DMRS sets comprises providing a first DMRS and a second DMRS forming a first pair of DMRS in one of the three DMRS sets with a same phase shift and providing a third DMRS and a fourth DMRS forming a second pair of DMRS in one of the three DMRS sets with a phase shift opposite to the phase shift of the first and second DMRS, respectively.

16. The at least one non-transitory machine-readable medium of claim 1, wherein the operation of adding the second modulation to the first of the three DMRS sets comprises providing a first DMRS and a second DMRS forming a first pair of DMRS in one of the three DMRS sets with a same phase shift and providing a third DMRS and a fourth DMRS forming a second pair of DMRS in one of the three DMRS sets with a phase shift opposite to the phase shift of the first and second DMRS, respectively.

17. The at least one non-transitory machine-readable medium of claim 1, wherein the operation of adding the second modulation and the adding the third modulation comprises adding a modulation selected from a group consisting of applying a positive phase shift, applying a negative phase shift and applying a zero phase shift.

18. Apparatus for a base station, comprising:
a downlink transmit path controller comprising circuitry to control transmission of demodulation reference signals in a sub-frame comprising two slots with each of the two slots having a physical resource block (PRB), wherein each PRB comprises a plurality of subcarriers for transmitting a plurality of symbols per slot; and
a reference signal allocator to:
allocate, in resource elements on each of three of the plurality of subcarriers, two pairs of demodulation reference signals (DMRS) to form three DMRS sets, the DMRS sets comprising known sequences;
map symbols with a first modulation for the two pairs of demodulation reference signals to three of the plurality of subcarriers for transmission; and
add a second modulation to a first of the three DMRS sets and add a third modulation to a second of the three DMRS sets to indicate side information regarding an interfering signal for use in mitigating the interfering signal;
wherein the first modulation, the second modulation, and the third modulation encode the side information, and wherein the side information is distinct from the known sequences.

19. The apparatus of claim 18, wherein the second modulation and the third modulation are each selected from the group consisting of a positive phase shift, a negative phase shift and a zero phase shift.

20. The apparatus of claim 18, wherein addition of the second modulation to the first of the three DMRS sets and the addition of the third modulation to the second of the three DMRS sets comprises selecting one technique from the group consisting of:
adding a same modulation to the first and second of the three DMRS sets, the second modulation being the same as the third modulation;
adding a different modulation to the first and the second of the three DMRS sets, the second modulation being different than the third modulation;
applying a symmetric modulation to the first of the DMRS sets and to the second of the DMRS sets, wherein the symmetric modulation comprises applying one phase shift selected from a group consisting of applying a positive phase shift to the first and the second of the three DMRS sets and applying a negative phase shift to the first and the second of the three DMRS sets;
applying an un-symmetric modulation to the first of the three DMRS sets and to the second of the DMRS sets, wherein the un-symmetric modulation comprises opposite phase shifts to the first and the second of the three DMRS sets.

21. The apparatus of claim 18, further comprising:
transceiver circuitry operatively coupled to the downlink transmit path controller and to an antenna arrangement.

22. A subscriber station comprising:
a downlink receive path comprising circuitry configured to receive a plurality of reference signals in a sub-frame comprising two slots with each of the two slots having a physical resource block (PRB), wherein each PRB comprises a plurality of subcarriers for transmitting a plurality of symbols per slot; and
a reference signal receiver configured to receive the plurality of reference signals comprising two pairs of demodulation reference signals (DMRS) to form three DMRS sets allocated in resource elements on each of three of the plurality of subcarriers, the DMRS sets comprising known sequences, wherein symbols for the two pairs of demodulation reference signals are modulated with a first modulation on three of the plurality of subcarriers and a first of the three DMRS sets includes a second modulation and a second of the three DMRS sets includes a third modulation, the second and third modulation arranged to indicate side information regarding an interfering signal for use in mitigating the interfering signal, wherein the first modulation, the second modulation, and the third modulation encode the side information, and wherein the side information is distinct from the known sequences.

23. The subscriber station of claim 22, wherein the second modulation and the third modulation comprises adding a modulation selected from a group consisting of applying a positive phase shift, applying a negative phase shift and applying a zero phase shift.

24. The subscriber station of claim 22, wherein the second modulation and the third modulation comprises a modulation from a group consisting of:
- a same modulation added to the first and second of the three DMRS sets when the second modulation is the same as the third modulation;
- a different modulation added to the first and the second of the three DMRS sets when the second modulation is different than the third modulation;
- a symmetric modulation added to the first of the DMRS sets and to the second of the DMRS sets, wherein the symmetric modulation comprises one phase shift selected from a group consisting of a positive phase shift applied to the first and the second of the three DMRS sets and a negative phase shift applied to the first and the second of the three DMRS sets; and
- an un-symmetric modulation applied to the first of the three DMRS sets and to the second of the DMRS sets, wherein the un-symmetric modulation comprises opposite phase shifts applied to the first and the second of the three DMRS sets.

* * * * *

UNITED STATES PATENT AND TRADEMARK OFFICE
CERTIFICATE OF CORRECTION

| | | |
|---|---|---|
| PATENT NO. | : 9,742,531 B2 | Page 1 of 1 |
| APPLICATION NO. | : 15/332602 | |
| DATED | : August 22, 2017 | |
| INVENTOR(S) | : Raaf et al. | |

It is certified that error appears in the above-identified patent and that said Letters Patent is hereby corrected as shown below:

On the Title Page

In Column 2, under "Other Publications", Line 1, delete "14/109,112;" and insert --14/109,112,-- therefor On page 2, in Column 2, under "Other Publications", Line 7, delete "Conpatibility" and insert --Compatibility-- therefor On page 3, in Column 2, under "Other Publications", Line 25, delete "Processess" and insert --Processes-- therefor In the Claims In Column 13, Line 51, in Claim 1, after "comprising:", insert --¶--

In Column 13, Line 54, in Claim 1, after "slot;", insert --¶--

In Column 13, Line 58, in Claim 1, after "sequences;", insert --¶--

In Column 13, Line 61, in Claim 1, after "and", insert --¶--

In Column 13, Line 64, in Claim 1, delete "signal," and insert --signal;¶-- therefor In Column 16, Line 11, in Claim 18, delete "add" and insert --adding-- therefor Signed and Sealed this
Twenty-eighth Day of April, 2020

Andrei Iancu
*Director of the United States Patent and Trademark Office*